(12) United States Patent
Nieddu et al.

(10) Patent No.: US 9,109,959 B2
(45) Date of Patent: Aug. 18, 2015

(54) CIRCUIT AND METHOD FOR MEASURING A RESISTANCE VALUE OF A RESISTIVE COMPONENT

(75) Inventors: Stefano Nieddu, Turin (IT); Fabio Autieri, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 776 days.

(21) Appl. No.: 13/352,827

(22) Filed: Jan. 18, 2012

(65) Prior Publication Data

US 2012/0185193 A1    Jul. 19, 2012

(30) Foreign Application Priority Data

Jan. 19, 2011    (GB) .................................. 1100881.0

(51) Int. Cl.
*G01K 7/24*    (2006.01)
(52) U.S. Cl.
CPC ........................................ *G01K 7/24* (2013.01)
(58) Field of Classification Search
CPC ............. G01K 7/24; G01K 7/20; G01K 7/16; G01K 7/22; G01K 7/25; G01K 7/21; G01K 15/00; G01K 15/005
USPC .............. 702/64, 65, 133; 324/600, 691, 705, 324/706, 712–714; 374/183, 185
See application file for complete search history.

(56) References Cited

U.S. PATENT DOCUMENTS

| 3,875,501 A | 4/1975 | Hayashi |
| 4,321,933 A | 3/1982 | Baessler |
| 8,794,831 B2 * | 8/2014 | Coursey et al. ............... 374/185 |
| 2012/0016610 A1 * | 1/2012 | Lan ................................ 702/65 |

FOREIGN PATENT DOCUMENTS

DE    102009053294 A1    5/2011

* cited by examiner

*Primary Examiner* — Manuel L Barbee
(74) *Attorney, Agent, or Firm* — Ingrassia Fisher & Lorenz PC

(57) ABSTRACT

A method is provided for measuring a resistance value of a resistive component, which provides for connecting a pull up resistance, in series to the component and supplying a first voltage value to a free end of the pull up resistance and a second lower voltage value to a free end of the component, monitoring a signal indicative of a voltage value between the component and the pull up resistance, determining the difference between the monitored signal and a generated PWM signal having a high voltage value and low voltage value, integrating the difference, obtaining an output signal, varying a duty cycle of the PWM signal based on the variation over time of the output signal, acquiring a duty cycle of the PWM signal, and determining the resistance value of the resistive component based on the duty cycle value and of the pull up resistance value.

20 Claims, 4 Drawing Sheets

CIRCUIT AND METHOD FOR MEASURING A RESISTANCE VALUE OF A RESISTIVE COMPONENT

CROSS-REFERENCE TO RELATED APPLICATION

This application claims priority to British Patent Application No. 1100881.0, filed Jan. 19, 2011, which is incorporated herein by reference in its entirety.

TECHNICAL FIELD

The technical field relates to a circuit for measuring the resistance of a resistive component, such as a PCT or NTC thermistor sensor used for monitoring the temperature values in a vehicle system.

BACKGROUND

It is known that modern vehicle systems are conventionally equipped with a plurality of resistive sensors for monitoring the temperature value of several components of the vehicle system. At the present, the resistive temperature sensors, generally used, are negative temperature coefficient thermistor (NTC) or positive temperature coefficient thermistors (PTC).

The measure of the temperature values are made using a voltage divider consisting in a pull up resistance, having a known resistance value, connected in series to the resistive sensor at a common node. Two different voltage values are supplied respectively to a free end of the voltage divider to generate at the common node an analog signal indicative of the resistance of the resistive sensor.

The analog signal is then converted to a digital signal by means of an analog to digital (A/D) converter, which, in turn, is connected to a control unit, usually an engine control unit (ECU) provided in the vehicle system. The ECU uses the digital signal to determine the corresponding temperature of the resistive sensor based on the kind of sensor, NTC or PTC.

The NTC and PTC thermistors have characteristics that make complicated and costly the interfacing with the A/D converter. This is mainly due to the transfer function of the sensors that is non-linear. The non-linearity of the transfer function leads to a low accuracy of the measured resistance values and, as a consequence, of the temperature values.

In detail, the NTC thermistor has a very low resolution at low temperatures, i.e., temperatures close to approximately −30° C., at a point that it does not allow to verify if the thermistor is correctly operating. On the other hand, the PTC thermistor allows more precise measures at the low temperatures but it is more expensive than the NTC thermistor.

In view of the above, it is at least one object to improve the resolution accuracy of the determination of a resistance value of a resistive component. At least another object is to make the measure of the resistance value independent from electrical component tolerances. At least another object is to achieve the above-mentioned objects with a simple, rational, and rather inexpensive solution. In addition, other objects, desirable features and characteristics will become apparent from the subsequent summary and detailed description, and the appended claims, taken in conjunction with the accompanying drawings and this background.

SUMMARY

An embodiment provides a method for measuring a resistance value $R_{TH}$ of a resistive component which provides for: connecting a pull up resistance, having a known resistance value $R_{PU}$, in series to the resistive component and supplying a first voltage value $V_P$ to a free end of the pull up resistance and a second lower voltage value $V_N$ to a free end of the resistive component to create a voltage divider, monitoring a signal indicative of a voltage value between the resistive component and the pull up resistance, determining the difference between the monitored signal and a generated pulse width modulated signal ($V_{PWM}$) having the voltage values $V_P$ and $V_N$ as high voltage value and low voltage value respectively, integrating the difference over time obtaining an output signal, varying a duty cycle of the pulse width modulated signal on the basis of the variation over time of the output signal, acquiring a value $D_1$ of the duty cycle of the pulse width modulated signal, and determining the resistance value on the basis of the duty cycle value $D_1$ and of the pull up resistance value $R_{pu}$.

This embodiment provides the ability to obtain a high monitoring resolution of the resistive component for any value of the resistance. Furthermore, the measured resistance value is independent from the temperature and from electrical component tolerances, depending only on the tolerances of the pull up resistance.

According to another embodiment, the variation of the duty cycle is achieved by commutating the pulse width modulated signal to the high voltage value when the output signal is equal or above a high threshold voltage value and commutating the pulse width modulated signal to the low voltage value when the output signal is equal or below a low threshold voltage value. This solution advantageously allows a good control of the variation of the output signal and consequently of the generated pulse width modulated signal.

According to another embodiment, the duty cycle D of the pulse width modulated signal, over a period, is calculated by the following equation:

$$D_1 = \frac{C_{ON}}{C_{ON} + C_{OFF}}$$

where $C_{on}$ and $C_{OFF}$ are digital counter values indicative of the variation over time of the pulse width modulated signal.

According to another embodiment, the digital counter value $C_{on}$ is set to zero every time the pulse width modulated signal value commutates from the low voltage value to high voltage value and then it is incremented at fixed frequency as long as the pulse width modulated signal value remains at the high voltage value. Differently, the counter value $C_{OFF}$ is incremented at fixed frequency as long as the pulse width modulated signal value is equal to the low voltage value and it is set and maintained at a value equal to zero as long as the pulse width modulated signal $V_{PWM}$ is equal to the high voltage value. This solution advantageously allows determining in a simple and reliable way the value variation of the digital counters.

According to another embodiment, the resistance value of the resistive component is determined by the equation:

$$R_{TH} = R_{PU} \times \left( \frac{D_1}{1 - D_1} \right)$$

where $R_{TH}$ is the pull up resistance value.

Another embodiment provides the further steps of inverting the voltage values VP and VN supplied at the respectively free ends of the series and, repeating the steps, acquiring a second value of the duty cycle D2, calculating an equivalent value of the duty cycle Deq on the basis of the previous determined duty cycles D1 and D2, determining the resistance of the resistive component on the basis of the equivalent duty cycle value $D_{EQ}$ and of the pull up resistance value $R_{pu}$. This solution advantageously minimizes or substantially eliminates the effects of input bias current and input offset voltage of the electric components that could limit the accuracy.

According to a further embodiment, the equivalent value of the duty cycle Deq is easily calculated according to the following equation:

$$D_{EQ} = \frac{D_1 + (1 - D_2)}{2}$$

Another embodiment provides a circuit for measuring a resistance value RTH of a resistive component comprising a pull up resistance connected in series to the resistive component at a common node, a pulse width modulated generator circuit for generating a pulse width modulated signal, the pulse width modulated circuit having an input connected to an adder for calculating the difference between a voltage signal at the common node and the pulse width modulated signal, and an output connected to a digital logic unit. This circuit has the advantage to allow ratiometric measures, i.e., the measured values of the resistance of the resistive component are independent from the voltage value supplied to the circuit.

According to another embodiment, the pulse width modulated generator circuit comprises a voltage integrator having an input connected to the adder and an output connected to a voltage commutator, which generates the pulse width modulated signal and which has an output connected to the digital logic unit. This solution allows generating the pulse width modulated signal in an inexpensive manner.

Another embodiment provides that a second commutator is connected between a free end of the pull up resistance and the digital logic unit, and a third commutator is connected between a free end of the resistive component and the logic unit, the second and third commutators being configured to alternatively supply a high first voltage value and a second low voltage value to the free end of the pull up resistance and to the free end of the resistive component. This solution allows eliminating input bias current and input offset voltage of the electric components in a simple and inexpensive manner.

According to a further embodiment, the pull up resistance is connected in series to the resistive component by means of a multiplexer device. This solution allows using only a pull up resistance in the case that it is required to measure the resistance value of several resistive components.

The operating method according can be carried out with the help of a computer program comprising a program-code for carrying out the method described above, and in the form of a computer program product comprising the computer program. The computer program product can be embodied as a control system, for instance for an internal combustion engine, comprising a control unit, for instance an engine control unit (ECU), a data carrier associated to the a control unit, and the computer program stored in the data carrier, so that, when the a control unit executes the computer program, the method described above is carried out. The method could be also embodied as an electromagnetic signal, said signal being modulated to carry a sequence of data bits which represent a computer program to carry out the method.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
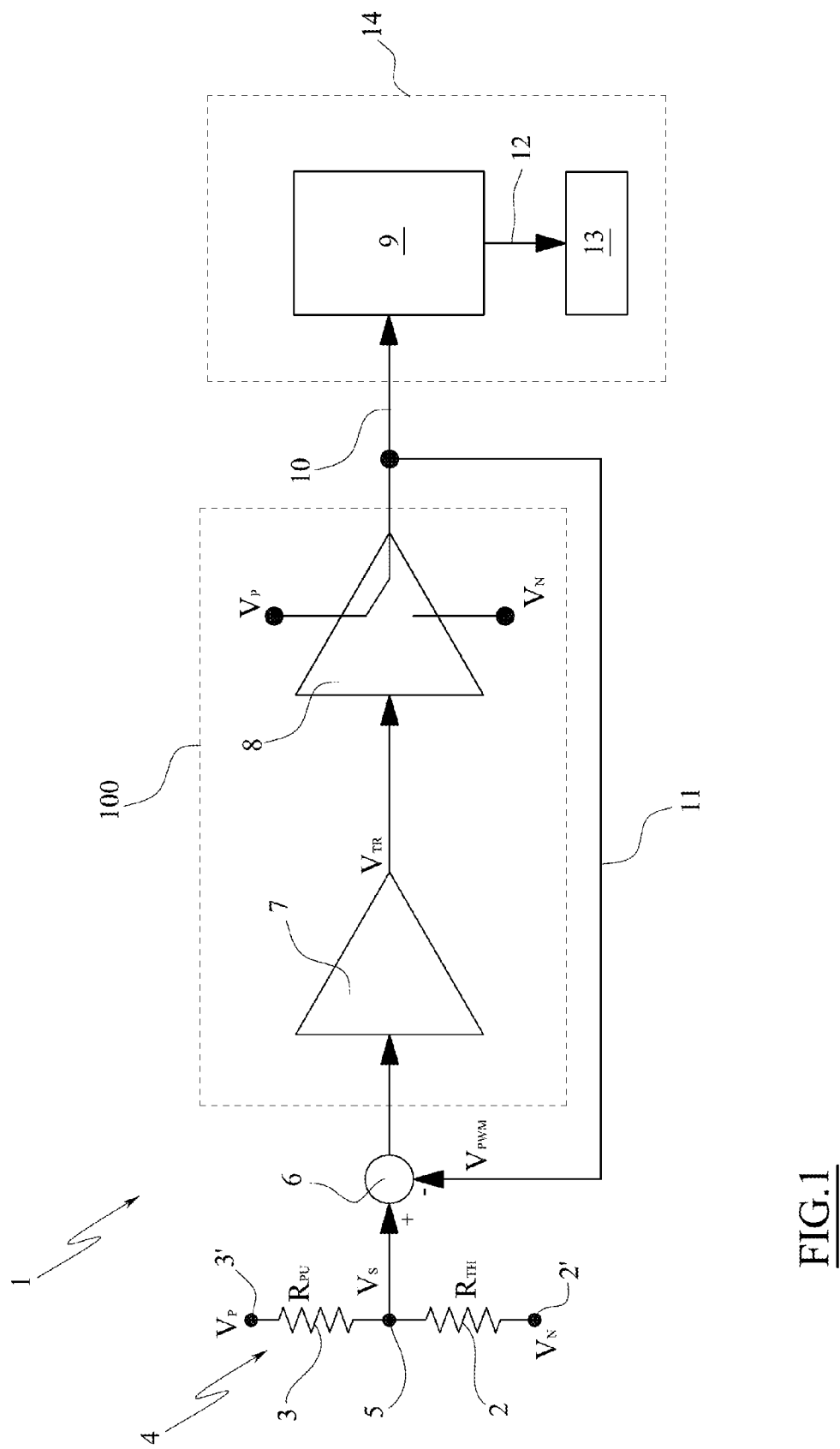
FIG. 1 is a scheme of a circuit for measuring a resistance value of a resistive component according to a first embodiment.

FIG. 1 illustrates a first embodiment comprising a circuit 1 for measuring a resistance value $R_{TH}$ of a resistive component 2. The resistive component 2 is connected in series to a pull up resistance 3 having a known resistance value $R_{PU}$ in order to make a voltage divider 4. To this end, the free end 3' of the pull up resistance 3 is supplied with a first voltage value $V_P$, while the free end 2' of the resistive component 2 is supplied with a second, lower, voltage value $V_N$.

At a common node 5 of the resistive component 2 and of the pull up resistance 3 the voltage divider 4 generates a voltage signal $V_S$ which can be calculated according to the following equation:

$$V_S = \frac{V_P \cdot R_{TH} + V_N \cdot R_{PU}}{R_{TH} + R_{PU}}$$

The common node 5 is connected to a first input of an adder 6 whose output is connected to an input of a generator pulse width modulated circuit 100 for generating a pulse width modulated (PWM) signal $V_{PWM}$. An output of the pulse width modulated circuit 100 is connected to a second input of the adder 6 and to a digital logic unit 9.

Figure 2E:
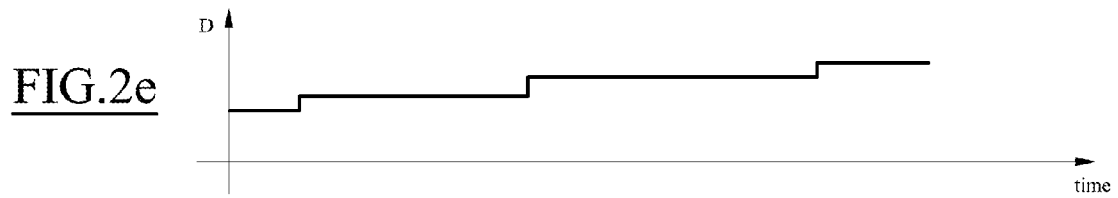
FIGS. 2a-2e, show the variation over time of some signals used in the invention.
Figure 2D:
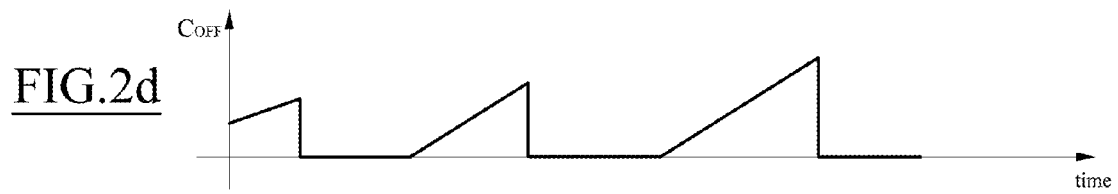
Figure 2C:
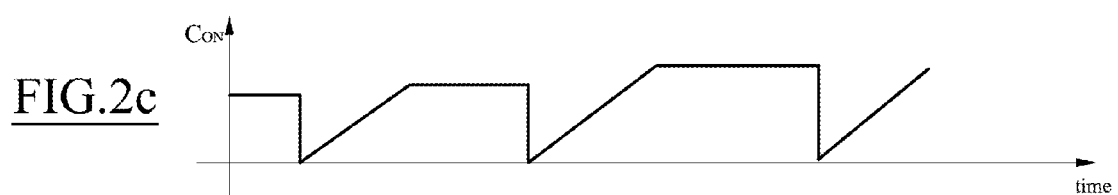

In detail, the pulse width modulated circuit 100 comprises a voltage integrator 7 having an output connected to an input of a voltage commutator 8, which generates the pulse width modulated signal $V_{PWM}$. An output of the voltage commutator 8 is connected to the digital logic unit 9 by means of a line 10 and to the adder 6, through a line 11, realizing a close-loop feedback of the pulse width modulated signal $V_{PWM}$. The adder 6, hence, determines the difference between the voltage signal $V_S$, represented in dotted line in FIG. 2a, and a pulse width modulated signal, represented in continuous line in FIG. 2a.

Figure 2B:
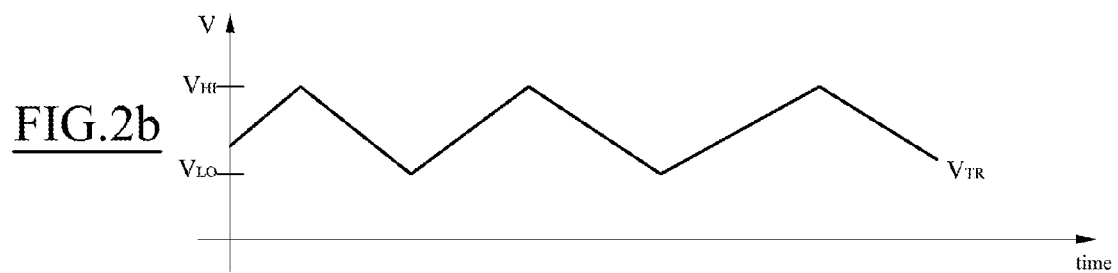
Figure 2A:
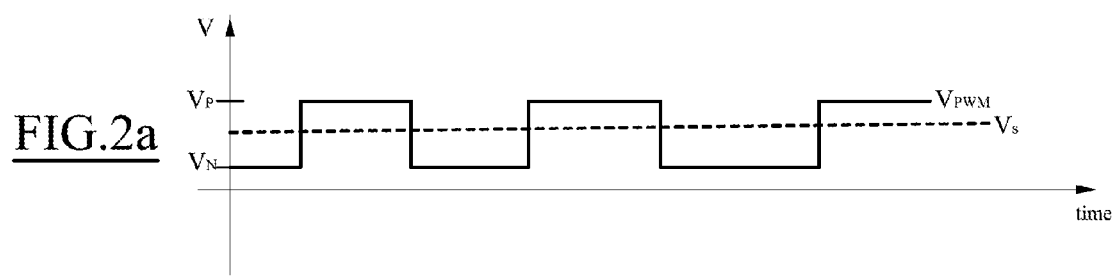

The result of said difference is the input signal for the voltage integrator 7, whose output voltage signal $V_{TR}$, illustrated in FIG. 2b, can be determined by means of the following equation:

$$V_{TR}=k\!\int(V_S-V_{PWM})dt$$

where k is a proportionality factor.

The output voltage signal $V_{TR}$ is sent, as input signal, to the voltage commutator 8 having input hysteresis width $V_{HB}$, which is defined as the difference between a first predetermined high voltage threshold value $V_{HI}$ and a second predetermined low voltage threshold value $V_{LO}$:

$$V_{HB}=V_{HI}-V_{LO}$$

The voltage commutator 8 generates, as output signal, the pulse width modulated signal $V_{PWM}$ having the voltage values $V_P$ and $V_N$ as high voltage value and low voltage value respectively. The pulse width modulated signal $V_{PWM}$ value depends on the voltage value of the output signal $V_{TR}$ filtered by the hysteresis width $V_{HB}$.

In detail, when the voltage value of the output signal $V_{TR}$ exceeds the high voltage threshold value $V_{HI}$ the commutator 8 switches the pulse width modulated signal $V_{PWM}$ value from the low voltage value $V_N$ to the high voltage value $V_P$. On the contrary, when the voltage value of the output signal $V_{TR}$ falls below low the voltage threshold value $V_{LO}$ the commutator 3 switches the pulse width modulated signal $V_{PWM}$ value from the high voltage value $V_P$ to the low voltage value $V_N$. In the present embodiment, the commutator 8 is a Schmidt trigger.

From FIG. 2b, which illustrates the variation of the signal $V_{TR}$ over time, it is possible to notice that when the difference, between the voltage signal $V_s$ value and the pulse width modulated signal $V_{PWM}$ value, is positive the output signal $V_{TR}$ value can be represented as an increasing ramp over time, while, when said difference is negative the output signal $V_{TR}$ voltage value can be represented as a decreasing ramp over time.

The pulse width modulated signal waveform is monitored by means of the digital logic unit 9 having the main function to acquire a duty-cycle value $D_1$ of the signal. Once the Duty-cycle value $D_1$ of the pulse width modulated signal $V_{PWM}$ has been acquired the signal $V_S$ can be determined on the basis of the acquired duty-cycle value $D_1$ and of the high and low voltage values $V_P$ and $V_N$ according to the following equation:

$$V_S=D_1 \cdot V_P+(1-D_1)\cdot V_N$$

However, as disclosed above, the voltage signal $V_S$ can also be calculate by means of the formula:

$$V_S = \frac{V_P \cdot R_{TH} + V_N \cdot R_{PU}}{R_{TH} + R_{PU}}$$

By substituting in the second formula the value of $V_S$ from the first formula it is possible to determine the resistance $R_{TH}$ value based on the pull up resistance value $R_{PU}$ and of the duty cycle value $D_1$ according to the following equation:

$$R_{TH} = R_{PU} \times \left(\frac{D_1}{1-D_1}\right)$$

According to an embodiment, the digital logic unit 9 acquires the duty-cycle $D_1$ of the pulse width modulated signal $V_{PWM}$ using internal digital counters value $C_{on}$ and $C_{off}$. In detail, the digital counter value $C_{on}$ is set to zero every time the pulse width modulated signal $V_{PWM}$ value commutates from the low voltage value $V_N$ to high voltage value $V_P$ and then it is incremented at fixed frequency as long as the pulse width modulated signal $V_{PWM}$ value remains at the high voltage value $V_P$, as illustrated in FIG. 2c. Differently, the counter value $C_{OFF}$ is incremented at fixed frequency as long as the pulse width modulated signal $V_{PWM}$ value is equal to the low voltage value $V_N$ and it is set and maintained at a value equal to zero as long as the pulse width modulated signal $V_{PWM}$ is equal to the high voltage value $V_P$, as illustrated in FIG. 2d.

The duty-cycle value $D_1$, of the pulse width modulated signal, can be determined or calculated using the last internal digital counter values $C_{on}$ and $C_{off}$ as follows:

$$D_1 = \frac{C_{ON}}{C_{ON} + C_{OFF}}$$

The digital logic unit 9 comprises an output line 12 connected to a microcontroller 13 so as to send the calculated resistance value $R_{TH}$ of the resistive component to the microcontroller 13 for using it in predetermined operating vehicle system strategy. As an example, if the resistive component is a PTC or NTC temperature sensor, the microcontroller will determine the temperature value corresponding to the determined resistance value $R_{TH}$ based on the kind of sensor. In the present embodiment, both the digital logic unit 9 and the microcontroller 13 are both embedded in a control unit 14.

Figure 3:
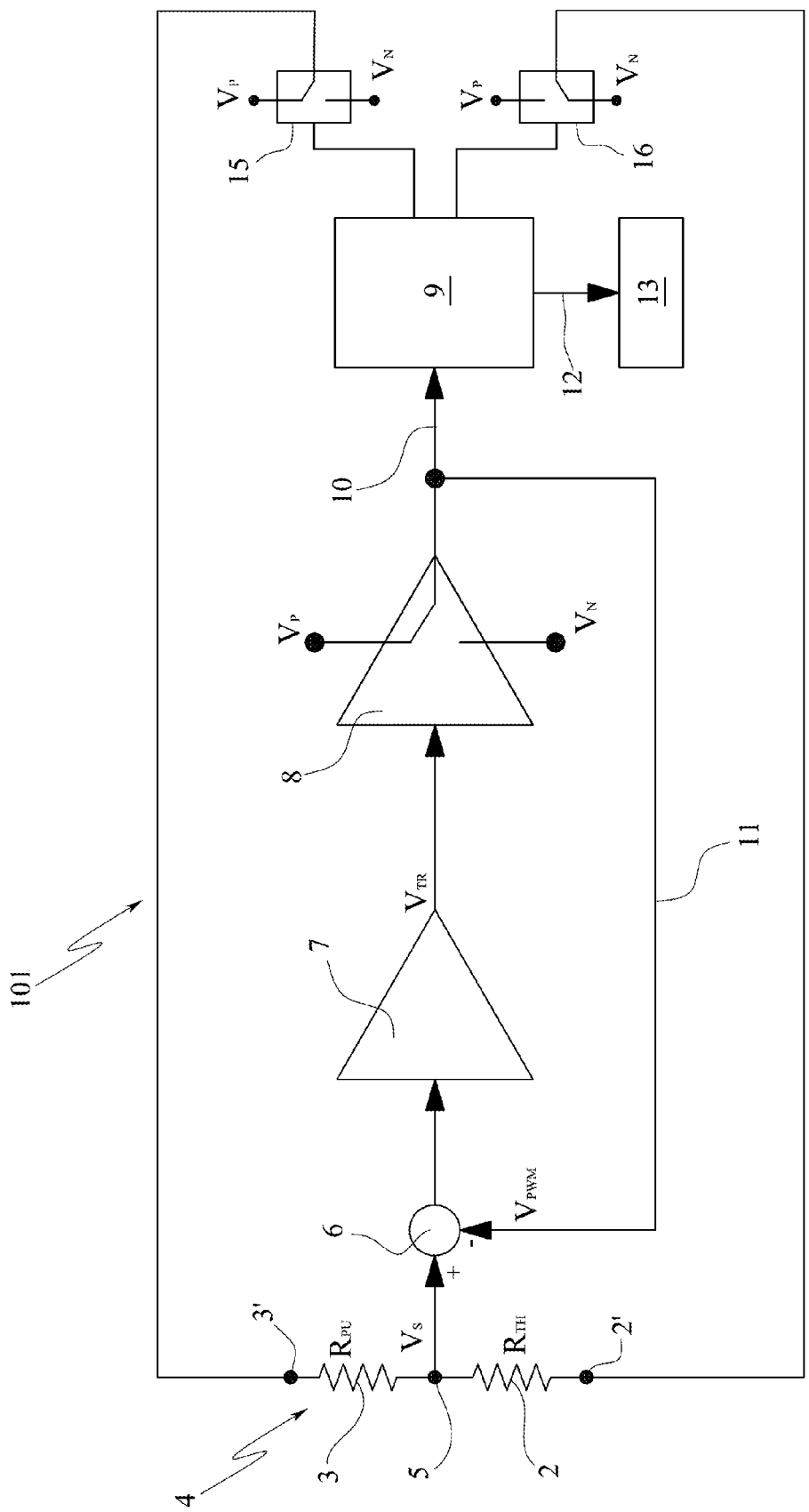
FIG. 3 is a scheme of a circuit for measuring a resistance value of a resistive component according to a second embodiment.

FIG. 3 illustrates a second embodiment of a circuit 100 for measuring a resistance value $R_{TH}$ of the resistive component 2. In the disclosure of the second embodiment will be use the same reference numbers to indicate components already disclosed in the first embodiment. In detail the second embodiment provides that a second commutator 15 be connected between the free end 3' of the pull up resistance 3 and the digital logic unit 9, and a third commutator 16 is connected between the free end 2' of the resistive component 2 and the logic unit 9. The second and the third commutators 15, 16 are configured to alternatively supply the first high voltage value $V_P$ and the second low voltage value $V_N$ to the free end 3' of the pull up resistance 3 and to the free end 2' of the resistive component 2.

Figure 4B:
FIGS. 4a and 4b show the variation over time of some signals used in the second embodiment.
Figure 4A:
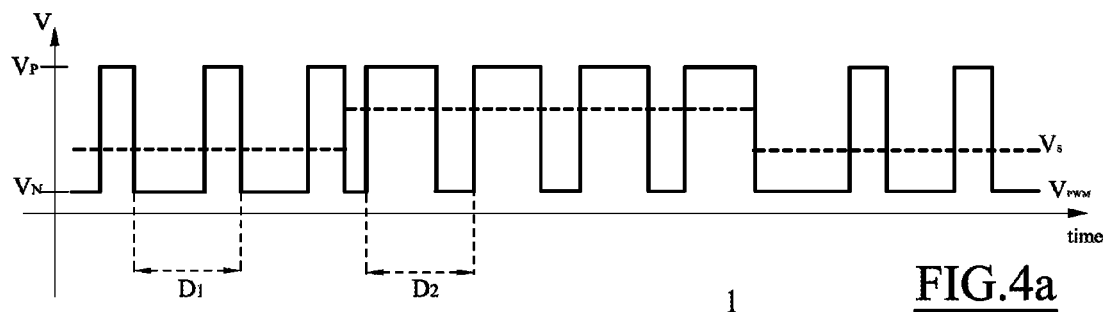

The operation of this embodiment of the invention provides to supply the high voltage value $V_P$ and the low voltage value $V_N$ respectively to the free end 3' of the pull up resistance 3 and to the free end 2' of the resistive component 2, and to acquire the duty cycle value $D_1$ (FIG. 4a) as previously disclosed in the first embodiment. Once the duty cycle value $D_1$ has been acquired, this embodiment provides to acquire a second duty cycle value $D_2$ (FIG. 4a) inverting the voltage values $V_P$ and $V_N$ supplied respectively to the free end 3' of the pull up resistance 3 and to the free end 2' of the resistive component 2. At this point it is possible to calculate an equivalent value of the duty cycle $D_{eq}$ based on the previous determined duty cycles $D_1$ and $D_2$, and to determine the resistance $R_{TH}$ of the resistive component 2 based on the equivalent duty cycle value $D_{EQ}$ and of the pull up resistance value $R_{PU}$.

According to another embodiment, the equivalent value of the duty cycle $D_{eq}$ is determined by the following equation:

$$D_{EQ} = \frac{D_1 + (1 - D_2)}{2}$$

Once the equivalent value of the duty cycle $D_{eq}$ has been determined, the resistance $R_{TH}$ of the resistive component 2 can be determined as follows:

$$R_{TH} = R_{PU} \times \left(\frac{D_{EQ}}{1 - D_{EQ}}\right)$$

Figure 5:
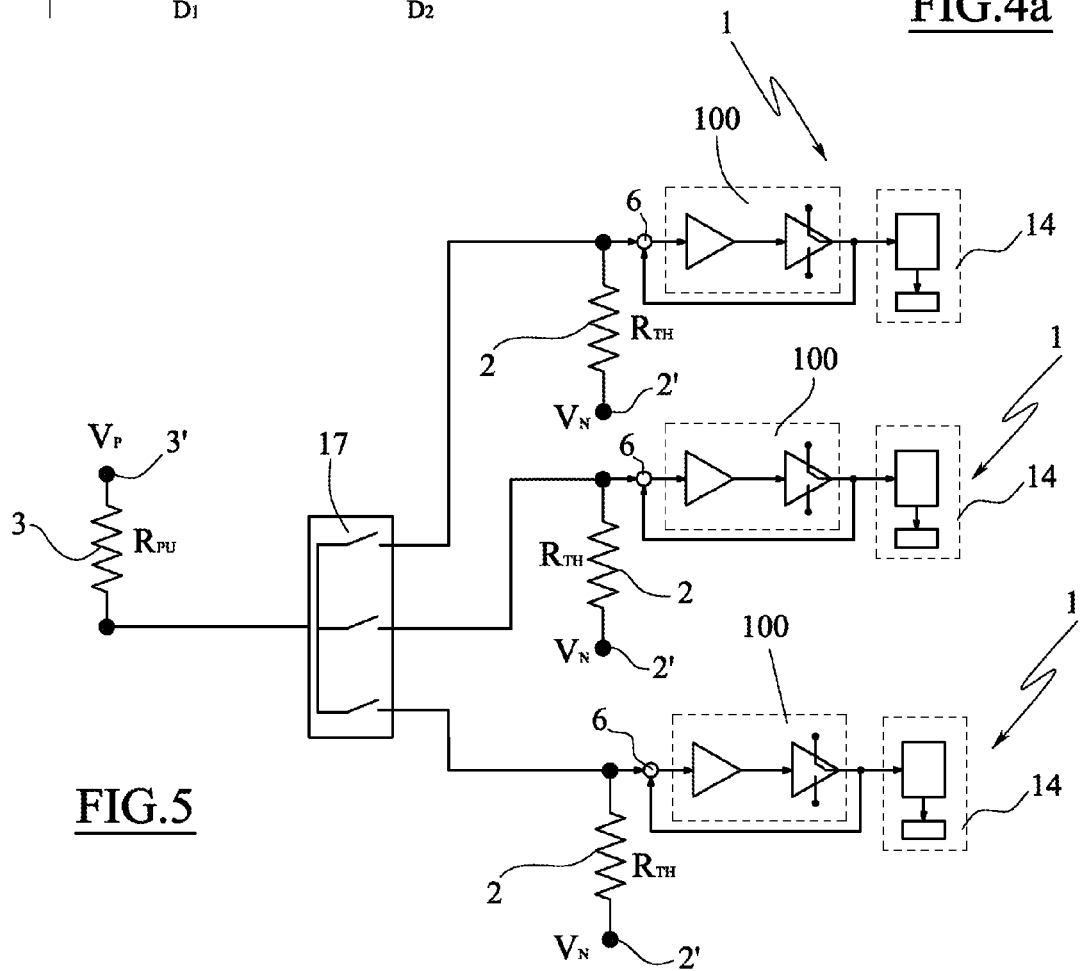
FIG. 5 is a scheme of a circuit for measuring a resistance value of a resistive component according to a third embodiment.

FIG. 5 illustrates a further aspect of the invention that is different from the above-disclosed embodiments for the fact that the pull up resistance 3 is connected in series to several resistive components by means of a multiplexer device 17. This solution allows a reduction of costs in the case it is required to measure the resistance value of several resistive components 2.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

What is claimed is:

1. A method for measuring a resistance value $R_{TH}$ of a resistive component, comprising:
   connecting a pull up resistance with a known resistance value $R_{PU}$ in series to the resistive component;
   supplying a first voltage value $V_P$ to a free end of the pull up resistance and a second lower voltage value $V_N$ to a free end of the resistive component to create a voltage divider;
   monitoring a signal $V_S$ indicative of a voltage value between the resistive component and the pull up;
   determining the difference between the monitored signal and a generated pulse width modulated signal having the voltage values $V_P$ and second lower voltage value $V_N$ as high voltage value and low voltage value, respectively;
   integrating a difference over time obtaining an output signal $V_{TR}$;
   varying a duty cycle of the pulse width modulated signal based on the variation over time of the output signal $V_{TR}$;
   acquiring a value $D_1$ of the duty cycle of the pulse width modulated signal; and
   determining the resistance value of the resistive component based at least in part on the duty cycle value $D_1$ and of the pull up resistance value $R_{PU}$.

2. The method according to claim 1, wherein the varying the duty cycle comprises:
   commutating the pulse width modulated signal to the high voltage value when the output signal is greater than or equal to a high voltage threshold value; and
   commutating the pulse width modulated signal to the low voltage value when the output signal is less than or equal to a low voltage threshold value.

3. The method according to claim 1, wherein the acquiring the value $D_1$ of the duty cycle of the pulse width modulated signal comprise calculating digital counter values $C_{on}$ and $C_{OFF}$ indicative of the variation over time of the pulse width modulated signal according to the following equation:

$$D_1 = \frac{C_{ON}}{C_{ON} + C_{OFF}}.$$

4. The method according to claim 3, further comprising:
   setting the digital counter value $C_{on}$ to zero if the pulse width modulated signal value commutates from the low voltage value to high voltage value; and
   incrementing the digital counter value $C_{on}$ at fixed frequency as long as the pulse width modulated signal value remains at the high voltage value.

5. The method according to claim 3, further comprising:
   incrementing the counter value $C_{OFF}$ at fixed frequency as long as the pulse width modulated signal value is equal to the low voltage value; and
   setting and maintaining the counter value $C_{OFF}$ at a value equal to zero as long as the pulse width modulated signal is equal to the high voltage value.

6. The method according to claim 1 wherein the resistance value $R_{TH}$ of the resistive component is determined by the equation:

$$R_{TH} = R_{PU} \times \left(\frac{D_1}{1 - D_1}\right).$$

7. The method according to claim 1, further comprising:
   inverting the voltage values $V_P$ and $V_N$ supplied at the respectively free ends of the series; and
   repeating:
   the monitoring a signal $V_S$ indicative of a voltage value between the resistive component and the pull up;
   determining the difference between the monitored signal and a generated pulse width modulated signal having the voltage values $V_P$ and second lower voltage value $V_N$ as high voltage value and low voltage value, respectively; and
   integrating a difference over time obtaining an output signal $V_{TR}$, varying a duty cycle of the pulse width modulated signal on the basis of the variation over time of the output signal $V_{TR}$;
   acquiring a second value of the duty cycle;
   calculating an equivalent value of the duty cycle based on the previous determined duty cycle values $D_1$ and $D_2$;
   determining the resistance of the resistive component based on the duty cycle value and of the pull up resistance value.

8. The method according to claim 7, wherein the equivalent value of the duty cycle is calculated according to the following equation:

$$D_{EQ} = \frac{D_1 + (1 - D_2)}{2}.$$

9. A circuit for measuring a resistance value of a resistive component comprising:
   a common node;
   a pull up resistance connected in series to the resistive component at the common node;
   a pulse width modulated signal generator circuit configured to generate a pulse width modulated signal;
   an adder configured to calculate the difference between a voltage signal at the common node and the pulse width modulated signal;

an input of the pulse width modulated circuit connected to the adder; and a digital logic unit connected to an output of the pulse width modulated circuit.

10. A circuit according to claim 9, wherein the pulse width modulated generator circuit comprises a voltage integrator having an input connected to the adder and an output connected to a voltage commutator, which generates the pulse width modulated signal and which has an output connected to the digital logic unit.

11. A circuit according to claim 9, wherein a second commutator is connected between a free end of the pull up resistance and the digital logic unit, and a third commutator is connected between a free end of the resistive component and the logic unit, the second and third commutators being configured to alternatively supply a high first voltage value and a second low voltage value to the free end of the pull up resistance and to the free end of the resistive component.

12. A circuit according to claim 9 wherein the pull up resistance is connected in series to the resistive component with a multiplexer device.

13. A non-transitory computer readable medium embodying a computer program product, said program product comprising:

a measuring program for measuring a resistance value $R_{TH}$ of a resistive component, the measuring program configured to:

connect a pull up resistance with a known resistance value $R_{PU}$ in series to the resistive component;

supply a first voltage value $V_P$ to a free end of the pull up resistance and a second lower voltage value $V_N$ to a free end of the resistive component to create a voltage divider;

monitor a signal $V_S$ indicative of a voltage value between the resistive component and the pull up;

determine the difference between the monitored signal and a generated pulse width modulated signal having the voltage values $V_P$ and second lower voltage value $V_N$ as high voltage value and low voltage value, respectively;

integrate a difference over time obtaining an output signal $V_{TR}$;

vary a duty cycle of the pulse width modulated signal based on the variation over time of the output signal $V_{TR}$;

acquire a value $D_1$ of the duty cycle of the pulse width modulated signal; and determine the resistance value of the resistive component based at least in part on the duty cycle value $D_1$ and of the pull up resistance value $R_{PU}$.

14. The non-transitory computer readable medium embodying the computer program product according to claim 13, wherein the measuring program is configured to vary the duty cycle by:

commutating the pulse width modulated signal to the high voltage value when the output signal is greater than or equal to a high voltage threshold value; and commutating the pulse width modulated signal to the low voltage value when the output signal is less than or equal to a low voltage threshold value.

15. The non-transitory computer readable medium embodying the computer program product according to claim 13, wherein the measuring program is configured to acquire the value $D_1$ of the duty cycle of the pulse width modulated signal comprise calculating digital counter values $C_{on}$ and $C_{OFF}$ indicative of the variation over time of the pulse width modulated signal according to the following equation:

$$D_1 = \frac{C_{ON}}{C_{ON} + C_{OFF}}.$$

16. The non-transitory computer readable medium embodying the computer program product according to claim 15, the measuring program further configured to:

set the digital counter value $C_{on}$ to zero if the power pulse width modulated signal value commutates from the low voltage value to high voltage value; and increment the digital counter value $C_{on}$ at fixed frequency as long as the pulse width modulated signal value remains at the high voltage value.

17. The non-transitory computer readable medium embodying the computer program product according to claim 15, the measuring program further configured to:

increment the counter value $C_{OFF}$ at fixed frequency as long as the pulse width modulated signal value is equal to the low voltage value; and set and maintain the counter value $C_{OFF}$ at a value equal to zero as long as the pulse width modulated signal is equal to the high voltage value.

18. The non-transitory computer readable medium embodying the computer program product according to claim 13, wherein the resistance value $R_{TH}$ of the resistive component is determined by the equation:

$$R_{TH} = R_{PU} \times \left(\frac{D_1}{1 - D_1}\right).$$

19. The non-transitory computer readable medium embodying the computer program product according to claim 13, the measuring program further configured to:

invert the voltage values $V_P$ and $V_N$ supplied at the respectively free ends of the series and, repeating the monitoring a signal $V_S$ indicative of a voltage value between the resistive component and the pull up, determining the difference between the monitored signal and a generated pulse width modulated signal having the voltage values $V_P$ and second lower voltage value $V_N$ as high voltage value and low voltage value, respectively, integrating a difference over time obtaining an output signal $V_{TR}$, varying a duty cycle of the pulse width modulated signal on the basis of the variation over time of the output signal $V_{TR}$;

acquiring a second value of the duty cycle;

calculate an equivalent value of the duty cycle on the basis of the previous determined duty cycle values $D_1$ and $D_2$; and determine the resistance of the resistive component based on the duty cycle value and of the pull up resistance value.

20. The non-transitory computer readable medium embodying the computer program product according to claim 19, wherein the equivalent value of the duty cycle is calculated according to the following equation:

$$D_{EQ} = \frac{D_1 + (1 - D_2)}{2}.$$

* * * * *